(12) United States Patent
Gudehus et al.

(10) Patent No.: US 11,148,679 B2
(45) Date of Patent: Oct. 19, 2021

(54) METHOD AND CONTROL UNIT FOR OPERATING A DRIVER-ASSISTANCE SYSTEM OF A VEHICLE

(71) Applicant: Robert Bosch GmbH, Stuttgart (DE)

(72) Inventors: Thorsten Gudehus, Kornwestheim (DE); Thorsten Schori, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 239 days.

(21) Appl. No.: 16/507,737

(22) Filed: Jul. 10, 2019

(65) Prior Publication Data

US 2020/0017119 A1 Jan. 16, 2020

(30) Foreign Application Priority Data

Jul. 10, 2018 (DE) .......................... 102018211440.4

(51) Int. Cl.
*B60W 50/08* (2020.01)
*B60W 30/16* (2020.01)

(52) U.S. Cl.
CPC .......... *B60W 50/082* (2013.01); *B60W 30/16* (2013.01); *B60W 2540/10* (2013.01); *B60W 2554/801* (2020.02)

(58) Field of Classification Search
CPC .... B60W 50/00; B60W 50/08; B60W 50/082; B60W 30/00; B60W 30/14; B60W 30/16; B60W 2554/00; B60W 2554/80; B60W 2554/801; B60W 2540/00; B60W 2540/10

See application file for complete search history.

(56) References Cited

U.S. PATENT DOCUMENTS

| | | | | |
|---|---|---|---|---|
| 5,839,534 A | * | 11/1998 | Chakraborty | ......... B60W 30/16 180/169 |
| 7,706,953 B1 | * | 4/2010 | Sun | ...................... B60K 31/042 701/93 |
| 2003/0045990 A1 | * | 3/2003 | Adachi | .............. B60K 31/0008 701/96 |
| 2009/0321165 A1 | * | 12/2009 | Haug | .................... B60W 10/08 180/65.275 |
| 2017/0151948 A1 | * | 6/2017 | Liu | ..................... B60W 40/105 |

* cited by examiner

*Primary Examiner* — James M McPherson
*Assistant Examiner* — Michael Allen Brace, Jr.
(74) *Attorney, Agent, or Firm* — Norton Rose Fulbright US LLP; Gerard Messina

(57) ABSTRACT

A method for operating a driver-assistance system of a vehicle includes switching from a distance controller of the driver-assistance system to an adaptive cruise control of the driver-assistance system as a function of a driver input by a driver of the vehicle expressed by an angular position of an accelerator pedal of the vehicle.

5 Claims, 2 Drawing Sheets

METHOD AND CONTROL UNIT FOR OPERATING A DRIVER-ASSISTANCE SYSTEM OF A VEHICLE

CROSS-REFERENCE TO RELATED APPLICATIONS

The present application claims priority under 35 U.S.C. § 119 to DE 10 2018 211 440.4, filed in the Federal Republic of Germany on Jul. 10, 2018, the content of which is hereby incorporated by reference herein in its entirety.

FIELD OF THE INVENTION

The present invention relates to a method and a control unit for operating a driver-assistance system of a vehicle.

BACKGROUND

In a vehicle that includes a distance controller, a situation-dependent setpoint distance to a vehicle driving ahead being adjusted. When approaching the vehicle driving ahead, the distance controller reduces an engine output of the vehicle in comparison with a driver input by a driver of the vehicle, which is picked up at an accelerator pedal of the vehicle, until the vehicle is trailing the vehicle at the setpoint distance at a speed of the vehicle traveling ahead. For example, the distance controller can be deactivated by a kickdown of the accelerator pedal, e.g., in order to overtake the vehicle driving ahead.

SUMMARY

Against this background, the approach presented here provides a method for operating a driver-assistance system of a vehicle and a control unit for operating a driver-assistance system of a vehicle and finally, a corresponding computer program product and a machine-readable memory medium.

Example embodiments of the present invention can advantageously allow for an automatic activation of an adaptive cruise control of a vehicle under certain conditions. The automation provides relief to a driver of the vehicle.

A method for operating a driver-assistance system of a vehicle is provided, which is characterized in that a change from a distance controller of the driver-assistance system to an adaptive cruise control of the driver-assistance system is carried out as a function of a driver input by a driver of the vehicle expressed through an angular position of an accelerator pedal of the vehicle.

Ideas in connection with example embodiments of the present invention can be considered to be based on the ideas and recognitions described in the following text, among others.

A driver-assistance system can encompass different function modules. One function module could be a distance controller. Another function module can be an adaptive cruise control. The distance controller is able to be controlled via the accelerator pedal, in particular. In this context, an adjusted distance can be affected by an angular position and/or angular velocity of an accelerator pedal.

A driver input by a driver of the vehicle is detected via an accelerator pedal of the vehicle. The driver input is represented by an angular position and/or angular velocity of the accelerator pedal.

An adaptive cruise control is able to control a power setpoint value for the drive unit of the vehicle as a function of a current speed of the vehicle and as a function of a current distance to a vehicle driving ahead. The vehicle traveling ahead can be denoted as a third-party vehicle.

The adaptive cruise control controls the power setpoint value until the current speed reaches a set setpoint speed. When the speed essentially corresponds to the setpoint speed, the adaptive cruise control controls the power setpoint value in such a way that the speed remains within an adjusted speed tolerance range around the setpoint speed. If the speed is lower than the setpoint speed, the power setpoint value is increased. If the speed is greater than the setpoint speed, the power setpoint value is reduced. As long as the current distance to a vehicle traveling ahead is greater than a predefined, speed-dependent setpoint distance, the speed will be kept within the speed tolerance range. If the distance essentially corresponds to the setpoint distance, the adaptive cruise control controls the power setpoint value so that the distance remains within a distance tolerance range. If the distance is greater than the setpoint distance, the power setpoint value is increased. If the distance is smaller than the setpoint distance, then the power setpoint value is reduced. If the distance becomes smaller more rapidly than can be compensated for by the reduced power setpoint value, a brake system of the vehicle will be activated in order to enlarge the distance back to the setpoint distance. The distance can be expressed by a time slot which is independent of the speed because a distance covered per time unit is a function of the speed.

The distance controller converts the driver input into the power setpoint value as a function of the current distance. A change in the driver input is converted into a change of the power setpoint value as a function of the current distance. The closer the current distance to a distance target value, the smaller the change in the power setpoint value. If the third-party vehicle decelerates and the distance target value is therefore not maintained, then the power setpoint value will be reduced and, if required, a brake system of the vehicle will be actuated in order to decelerate the vehicle as well.

The change between the accelerator-pedal-based distance controller and the adaptive cruise control can be undertaken when the driver input is stable for longer than a certain holding period within a tolerance range. Because of the stable driver input, a driving behavior of the vehicle is achieved that essentially corresponds to a driving behavior with an activated adaptive cruise control. This makes it possible to change to the adaptive cruise control without the vehicle being subjected to a jerk. After the change, the driver can take the foot off the accelerator pedal and drive in a relaxed manner.

The change can also be carried out when the distance controller controls the distance to a vehicle driving ahead and the driver input also does not represent a further desire to approach the vehicle. The driver then drives the vehicle in virtually the same manner as the adaptive cruise control would do. A change to the adaptive cruise control can therefore easily be made.

The change can be implemented when a dynamics of the driver input lies within a dynamics-tolerance range. When the driver input does not change all the time, the driver is driving at an essentially constant speed. By switching to the adaptive cruise control, the driver is able to take the foot off the accelerator pedal and continue driving in a relaxed manner.

The change can be carried out when the driver input lies within a tolerance range around a controlled variable of the driver-assistance system. A controlled variable can be an output signal of the driver-assistance system, by which the vehicle or a component of the vehicle, such as its drive unit or the brakes, is actuated. The driver input also serves to actuate the vehicle. When the driver outputs the driver input such that it resembles the way the driver-assistance system would control the vehicle just then, a switch to the adaptive cruise control can be made without a noticeable transition.

The change can be undertaken when the driver input lies within the tolerance range around the power setpoint value of the adaptive cruise control. The angular position of the accelerator pedal and the power setpoint value have the same effect on the drive unit of the vehicle. This makes it easy to compare the two variables. For example, the angular position can be directly converted into the power setpoint value via a conversion factor.

An indication can be output to the driver prior to the change. Using an optical, acoustic, or haptic indication, the driver is able to be informed that the driver-assistance system will subsequently switch to the adaptive cruise control. The driver therefore knows at which point he can take the foot off the accelerator pedal.

The change can be made when a confirmation input from the driver is detected following the indication. The driver-assistance system can wait until the driver agrees to the change. This avoids inappropriate changes that have occurred simply because the driver happens to meet the conditions for the change.

The confirmation input can be detected when, a characteristic of the angular position of the accelerator pedal that is defined as a confirmation gesture is read in following the indication. Via the accelerator pedal, the driver is able to confirm the driver's desire to switch to the adaptive cruise control. For example, the driver can take the foot off the brake pedal more slowly than an upper limit speed and more rapidly than a lower limit speed. In the same way, for example, the driver can briefly step on the accelerator pedal and then rapidly remove the foot from the accelerator pedal. The confirmation gesture can be freely defined within limits. However, at the end of the gesture, the driver has taken the foot off the accelerator pedal.

The present method can be implemented in software or hardware or in a mixed form of software and hardware, for instance in a control unit.

In addition, the approach presented here provides a control unit, which is developed to carry out, actuate and implement the steps of a variant of the method introduced here in corresponding devices. The control unit can be an electrical device having at least one processing unit for processing signals or data, at least one memory unit for storing signals or data, and at least one interface and/or communications interface for reading in or outputting data that are embedded in a communications protocol. For example, the processing unit can be a signal processor, or what is known as a system ASIC, or a microcontroller for processing sensor signals and outputting data signals as a function of the sensor signals. The memory unit, for example, can be a flash memory, an EPROM or a magnetic memory unit. The interface could be developed as a sensor interface for reading in the sensor signals from a sensor and/or as an actuator interface for outputting the data signals and/or control signals to an actuator. The communications interface can be developed to read in or output the data in a wireless and/or a wire-conducted manner. The interfaces can also be software modules, which are provided on a microcontroller in addition to other software modules, for example.

Also advantageous is a computer program product or a computer program having program code, which can be stored on a machine-readable carrier or memory medium such as a semiconductor memory, a hard-disk memory, or an optical memory and can be used for carrying out, implementing, and/or actuating the steps of the present method according to one of the previously described example embodiments, in particular when the program product or program is executed on a computer or a device.

It is pointed out that a few of the possible features and advantages of the present invention have been described here with reference to different embodiments. One skilled in the art will understand that the features of the control unit and the method are able to be suitably combined, adapted, or exchanged in order to arrive at further example embodiments of the present invention.

In the following text, example embodiments of the present invention are described with reference to the appended drawing, but neither the drawing nor the description should be interpreted as restricting the present invention. The FIGURE is merely schematic and not true to scale. Identical reference numerals in the FIGURE denote identical features or features having the same effect.

DETAILED DESCRIPTION

Figure 1:
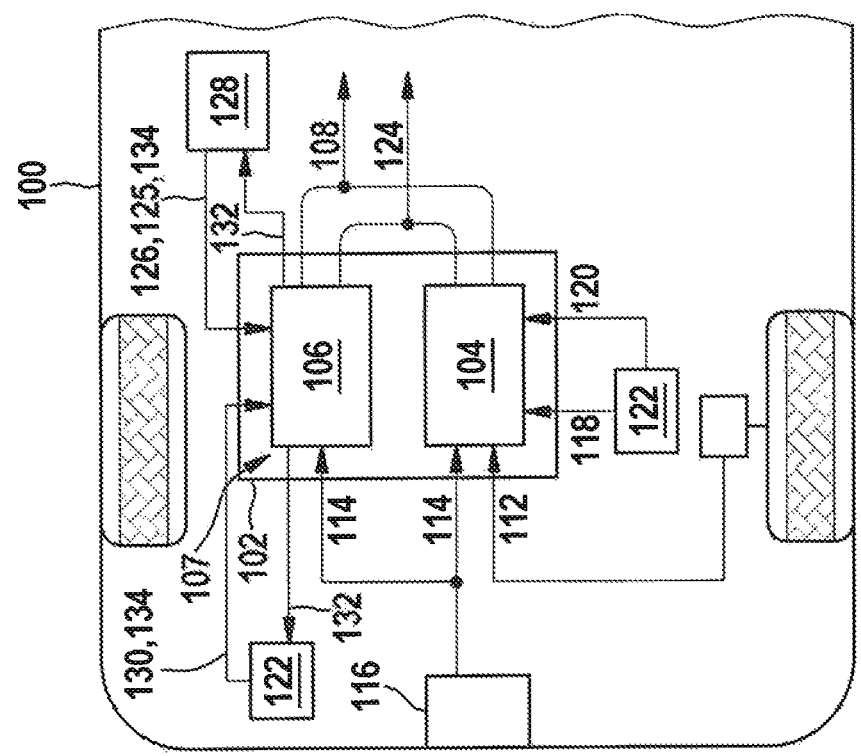
FIG. 1 is an illustration of a vehicle behind a third-party vehicle during a change from an accelerator-pedal-controlled distance controller to an adaptive cruise control according to an example embodiment.
Figure 1:
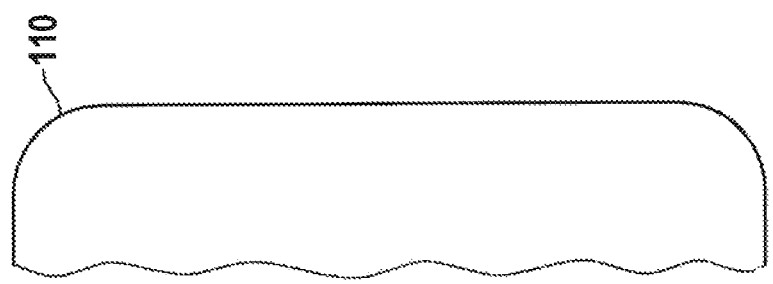

FIG. 1 shows an illustration of a vehicle 100 including a control unit 102 according to an example embodiment. An adaptive cruise control 104 and a distance controller 106 are implemented in control unit 102. Control unit 102 can have additional functions of a driver-assistance system 107 of vehicle 100, which will not be described here.

Adaptive cruise control 104 is a controller for a power setpoint value 108 of vehicle 100. Power setpoint value 108 represents a power to be output by a power unit of vehicle 100. When adaptive cruise control 104 is active, it controls the output power as a function of a current speed of vehicle 100 and a current distance between the vehicle and a vehicle 110 traveling ahead.

Toward this end, adaptive cruise control 104 reads in a speed value 112 and a distance value 114. Speed value 112 represents the current speed. Distance value 114 represents the current distance to vehicle 110 traveling ahead. The current distance is measured by a distance sensor 116 of vehicle 100.

In addition, adaptive cruise control 104 reads in a setpoint speed value 118 and a setpoint distance value 120. Setpoint speed value 118 represents a setpoint speed of the vehicle and can be adjusted by a driver of vehicle 100 via an interface 122. Setpoint distance value 120 represents a setpoint distance to vehicle 110 traveling ahead. Setpoint distance value 120, too, is adjusted by the driver via interface 122 or via a further interface, which is not shown here.

The setpoint distance is speed-dependent. At a greater speed, the setpoint distance is greater than at a lower speed. Setpoint distance value 120 can thus be read in as a time gap that is independent of the speed. The time gap describes a time interval until vehicle 100 passes the same point that was previously passed by vehicle 110 driving ahead.

Adaptive cruise control 104 increases power setpoint value 108 when the speed of vehicle 100 is slower than the setpoint speed. Conversely, power setpoint value 108 is reduced when the speed is greater than the setpoint speed. In addition, power setpoint value 108 is reduced when the distance is smaller than the setpoint distance. This causes the speed to drop. As long as the speed is slower than the setpoint speed, power setpoint value 108 will be increased when the distance is greater than the setpoint distance.

When the distance becomes smaller than the setpoint distance, for instance because vehicle 110 driving ahead is decelerating, then adaptive cruise control 104 outputs a braking setpoint value 124 for a brake system of vehicle 100 in order to decelerate vehicle 100 until the distance once again conforms to the setpoint distance.

Distance controller 106 is also a controller for power setpoint value 108. When distance controller 106 is active, it controls the output power as a function of the distance and a driver input 125 by the driver. Driver input 125 is represented by an accelerator-pedal angle 126 of an accelerator pedal 128 of vehicle 100. Driver input 125 is converted into power setpoint value 108 using the distance.

Toward this end, distance controller 106 reads in a distance target value 130. Distance target value 130 represents a minimum distance which is predefined by the driver at interface 122 or at some other interface that is not shown.

The minimum distance is speed-dependent. At a greater speed, the minimum distance is greater than at a lower speed. Distance target value 130 can therefore also be read in as a time gap which is independent of the speed. The minimum distance can be smaller than or equal to the setpoint distance for adaptive cruise control 104.

As long as the current distance outside a buffer range exceeds the minimum distance, driver input 125 is directly converted into power setpoint value 108. If the distance lies within the buffer range, driver input 125 is translated into power setpoint value 108 in reduced form. The closer the distance to the minimum distance, the less driver input 125 will be converted into power setpoint value 108. If the distance corresponds to the minimum distance, then distance controller 106 controls power setpoint value 108 in such a way that no drop below the minimum distance will occur.

If a reduction of power setpoint value 108 is insufficient to reach distance target value 130, then distance controller 106 outputs braking setpoint value 124 for the brake system of vehicle 100 in order to decelerate vehicle 100 until the distance once again conforms to the minimum distance.

In an example embodiment, the driver is able to influence the minimum distance. When the driver increases accelerator-pedal angle 126 so that it lies above a threshold value, and/or if the driver modifies it at an angular velocity that lies above a threshold value, then the time gap that corresponds to set distance target value 130 will be reduced. More specifically, the time gap is reduced in a stepwise manner. The time gap can minimally become as small as an entire reaction time of the system.

When the driver once again signals a reduced driver input 125 via accelerator pedal 128, the time gap is increased again.

In other words, vehicle 100 drives behind a third-party vehicle 110. In this case, a change from accelerator-pedal-controlled distance controller 106 to adaptive cruise control 104 takes place according to an example embodiment.

Vehicle 100 includes driver-assistance system 107, which is implemented or actuated by control unit 102. Driver-assistance system 107 is able to be operated in a plurality of modes. As a minimum, driver-assistance system 107 includes the mode of distance controller 106 and the mode of adaptive cruise control 104.

In the mode of distance controller 106, the driver of vehicle 100 operates accelerator pedal 128 of vehicle 100 in order to adjust the speed of vehicle 100. Angular position 126 of accelerator pedal 128 represents driver input 125, that is to say, how fast the driver wishes to drive. In the mode of distance controller 106, driver input 125 is directly converted into power setpoint value 108 for a power unit of vehicle 100 until vehicle closes the gap to third-party vehicle 110.

If the distance to third-party vehicle 110 is less than the buffer distance, driver input 125 is converted into power setpoint value 108 in attenuated form in order to reduce a speed differential between the vehicles. The smaller the distance becomes, the more distance controller 106 reduces power setpoint value 108. When the distance corresponds to distance target value 130, power setpoint value 108 is adjusted so that the speed of vehicle 100 corresponds to the speed of third-party vehicle 110.

Distance target value 130 represents the minimum distance predefined by the driver at interface 122 or at some other interface, which is not shown.

In an example embodiment, the driver is able to influence distance target value 130 through driver input 125. When the driver considers distance target value 130 to be excessive, the driver is able to increase driver input 125 in order to reduce distance target value 130. The greater driver input 125, the smaller distance target value 130 becomes. In the process, distance target value 130 is reduced minimally to such an extent that it corresponds to a speed-dependent minimum safety distance.

If the driver keeps driver input 125 nearly constant for the duration of a holding period after adjusting the distance to distance target value 130, then driver-assistance system 107 changes the mode. Following the change, vehicle 100 is operated using adaptive cruise control 104. The driver can take the driver's foot off accelerator pedal 128 after the change. Driver-assistance system 107 then drives autonomously behind third-party-vehicle 110 at the distance and/or a selected maximum speed. The change can also take place when the driver follows third-party vehicle 110 traveling ahead during accelerations and decelerations at a distance that corresponds to distance target value 130.

In an example embodiment, driver-assistance system 107 also changes the mode from distance controller 106 to adaptive cruise control 104 when the driver keeps driver input 125 approximately constant for the duration of the holding period while driving on open roads. A speed predefined by a speed limit can then be used as the maximum speed. The change can also take place when the driver drives at the same speed as the setpoint speed during a past use of adaptive cruise control 104 for the duration of the holding period.

In an example embodiment, prior to the change, an optical, acoustic, or haptic indication 132 is provided to the driver via interface 122 or some other interface of the vehicle. Indication 132 can also be provided via accelerator pedal 128. Indication 132 informs the driver of the imminent change and the driver is able to respond accordingly. When adaptive cruise control 104 is activated, the driver can take the driver's foot off accelerator pedal 128.

In an example embodiment, a wait takes place prior to the change until the driver expresses a confirmation input 134. Confirmation input 134, for instance, can be read in via interface 122 or some other interface of vehicle 100. In the same way, the confirmation input is able to be read in via accelerator pedal 128.

The confirmation input can be read in in the form of a confirmation gesture at accelerator pedal 128. The driver can operate and/or release accelerator pedal 128 in a predefined manner. For example, the driver can release accelerator pedal 128 at a predefined speed following indication 132.

The approach introduced here presents accelerator-pedal-based state transitions in the area of accelerator-pedal-based distance controller 106 DDA and adaptive cruise control 104 ACC or more highly automated driver-assistance functions.

Different state transitions to and between the functions of distance controller 106 DDA and adaptive cruise control 104 ACC are simplified using the accelerator-pedal behavior. For example, an uncomplicated use and high availability of the driver-assistance functions at a low utilization of a user interface 122 or an HMI element such as a steering column switch are able to be achieved. A distraction of the driver can be reduced and the driving enjoyment is able to be increased.

For state transitions between adaptive cruise control 104 ACC and distance controller 106 DDA, distance controller 106 DDA can be used as an initially active and comfortable protection function when the vehicle is started up. In addition, distance controller 106 DDA can be used as a fault fallback level of adaptive cruise control 104 ACC and more highly automated functions. Finally, distance controller 106 DDA can be used as fallback level following a deactivation of adaptive cruise control 104 via a braking intervention.

In many situations, distance controller 106 DDA is able to dynamically adapt to the driver through driver-input information 125 via accelerator pedal 128 and offers an uncomplicated operation with little interaction with the steering column switch. However, there are also situations in which adaptive cruise control 104 ACC continues to offer greater comfort than distance controller 106 DDA since no accelerator-pedal operation is required. If no target object is present or if a longer, not very dynamic drive is to be expected, adaptive cruise control 104 ACC is desirable.

In order to be able to utilize the advantages of adaptive cruise control 104 in different situations, an accelerator-pedal-based switch from distance controller 106 DDA to adaptive cruise control 104 ACC takes place in the approach presented here.

For example, at constant driving without target object, a switch to adaptive cruise control 104 ACC is made when ego vehicle 100 drives with an active distance controller 106 DDA and an approximately constant speed is maintained on an interstate for a certain period of time. The behavior of the driver is then interpreted as a wish for travel using adaptive cruise control 104 ACC. Driver-assistance system 107 can offer the driver an activation of adaptive cruise control 104 ACC via a user interface 122 HMI, for example. If the driver then reduces accelerator pedal input 125 only slowly, adaptive cruise control 104 ACC becomes active. However, if the driver continues to stay on accelerator pedal 128 or changes accelerator-pedal angle 126 in a noticeable manner, e.g., a delta accelerator pedal (FP) is greater than a threshold or an accelerator pedal (FP) gradient is greater than a threshold, then distance controller 106 DDA continues to remain active.

During a constant travel with a target object, a switch to adaptive cruise control 104 ACC can take place when ego vehicle 100 is driving with an active distance controller 106 DDA and approaches a slower target vehicle on the interstate. Because of distance controller 106 DDA, ego vehicle 100 is kept at a distance by the virtual air buffer. However, if the driver remains on accelerator pedal 128 in a virtually constant manner for a certain period of time despite contact with the air buffer, then this will be interpreted as a desire for trailing travel and an activation of adaptive cruise control 104 ACC. In this case, adaptive cruise control 104 ACC can be activated relatively rapidly using the target-vehicle speed so that the vehicle behavior resembles docking to the air buffer of distance controller 106 DDA.

In an example embodiment, in addition to the activation of adaptive cruise control 104 ACC, a follow function is activated as well. Rather than a set speed, the controlled distance to the target vehicle will then be the target variable.

Figure 2:
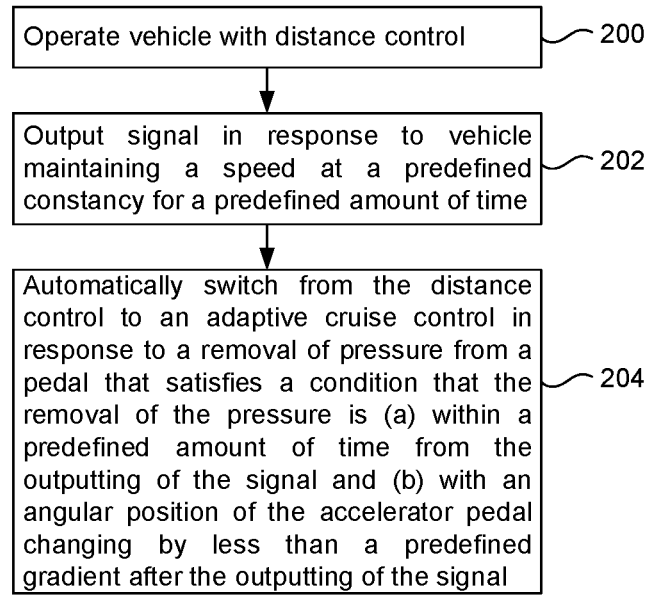
FIG. 2 is a flowchart that illustrates a method for automatically switching from a distance control to an adaptive cruise control, according to an example embodiment of the present invention.

FIG. 2 illustrates a method according to an embodiment of the present invention in which, at step 200, a vehicle is initially operated with a distance control. At step 202, a system of the vehicle outputs a signal in response to the vehicle speed being maintained with constancy for a predefined amount of time. At step 204, the vehicle automatically switches from the distance control to an adaptive cruise control in response to the driver's removal of pressure from a pedal, where the pressure removal satisfies a condition that it is within a predefined amount of time from the signal output and is with an angular position of the accelerator pedal changing by less than a predefined gradient.

Figure 3:
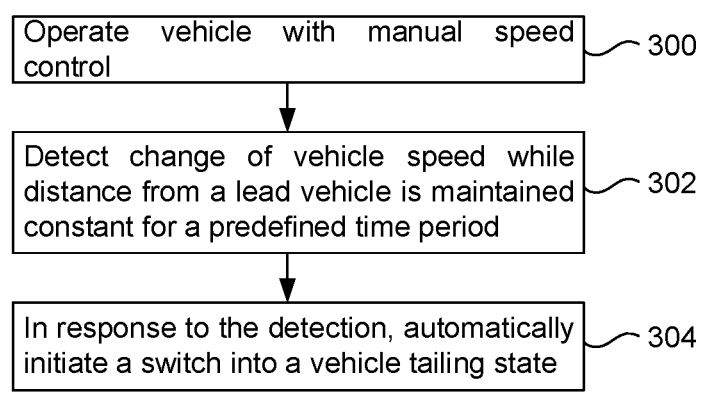
FIG. 3 is a flowchart that illustrated a method for automatically switching in a vehicle tailing state, according to an example embodiment of the present invention.

FIG. 3 illustrates a method according to an example embodiment of the present invention in which, at step 300, a vehicle is operated with a manual speed control. At step 302, a system of the vehicle detects that the vehicle speed changing while a distance of the vehicle from a lead vehicle is maintained constant for a predefined time period. At step 304, the vehicle is automatically switched into a vehicle tailing state in response to the detection.

Terms like 'having', 'including', etc. do not exclude other elements or steps, and terms like 'a' or 'one' do not exclude a multiplicity.

What is claimed is:

1. A method for operating a driver-assistance system of a vehicle, the method comprising:
    outputting a signal in response to the vehicle maintaining a speed at a predefined constancy for a predefined period of time while the vehicle is in a state in which the vehicle is operated by a distance control; and
    responding to a removal of pressure from an accelerator pedal within a predefined amount of time from the outputting of the signal by automatically switching from the distance control to an adaptive cruise control, wherein the switching is not performed if the pressure is not removed from the accelerator pedal within the predefined amount of time and is not performed if an angular position of the accelerator pedal changes by greater than a predefined gradient after the outputting of the signal.

2. The method of claim 1, wherein the signal is output via the accelerator pedal.

3. A control unit for a vehicle, the control unit comprising a processor, wherein the processor is configured to perform a method for operating a driver-assistance system of a vehicle, the method comprising:
    outputting a signal in response to the vehicle maintaining a speed at a predefined constancy for a predefined period of time while the vehicle is in a state in which the vehicle is operated by a distance control; and responding to a removal of pressure from an accelerator pedal within a predefined amount of time from the outputting of the signal by automatically switching from the distance control to an adaptive cruise control, wherein the switching is not performed if the pressure is not removed from the accelerator pedal within the predefined amount of time and is not performed if an angular position of the accelerator pedal changes by greater than a predefined gradient after the outputting of the signal.

4. A non-transitory computer-readable medium on which are stored instructions that are executable by a processor and that, when executed by the processor, cause the processor to perform a method for operating a driver-assistance system of a vehicle, the method comprising:

outputting a signal in response to the vehicle maintaining a speed at a predefined constancy for a predefined period of time while the vehicle is in a state in which the vehicle is operated by a distance control; and responding to a removal of pressure from an accelerator pedal within a predefined amount of time from the outputting of the signal by automatically switching from the distance control to an adaptive cruise control, wherein the switching is not performed if the pressure is not removed from the accelerator pedal within the predefined amount of time and is not performed if an angular position of the accelerator pedal changes by greater than a predefined gradient after the outputting of the signal.

5. A method for operating a driver-assistance system of a vehicle, the method comprising:

during a manual speed control of the vehicle, the vehicle detecting that a speed of the vehicle is changing while maintaining approximately a constant distance from a lead vehicle for a predefined time period; and in response to the detection, the vehicle automatically initiating a switch into a vehicle tailing state in which the vehicle automatically controls the speed of the vehicle to maintain approximately the constant distance from the lead vehicle.

* * * * *